United States Patent [19]

Swingley

[11] 4,044,741
[45] Aug. 30, 1977

[54] FUEL VAPOR GENERATOR

[76] Inventor: Wayne Swingley, Rte. 6, Box 138, Spokane, Wash. 99207

[21] Appl. No.: 608,040

[22] Filed: Aug. 27, 1975

[51] Int. Cl.² .................................................. F02M 31/00
[52] U.S. Cl. .......................... 123/122 AB; 123/122 A; 123/141; 261/145; 261/DIG. 39
[58] Field of Search ............ 123/122 A, 122 AB, 141, 123/34 A, 122 AC; 48/180 R; 261/144, 145, 142, 78 R, DIG. 39

[56] References Cited

U.S. PATENT DOCUMENTS

| 1,016,741 | 2/1912 | Fritz | 123/122 A |
|---|---|---|---|
| 2,588,474 | 3/1952 | Bellios | 123/141 |
| 3,554,174 | 1/1971 | Clawson | 123/122 A |
| 3,640,256 | 2/1972 | Low | 261/145 |
| 3,762,385 | 10/1973 | Hollnagel | 123/122 A |

FOREIGN PATENT DOCUMENTS 219,195   7/1924   United Kingdom ................. 261/144

Primary Examiner—Ronald H. Lazarus
Attorney, Agent, or Firm—Wells, St. John & Roberts

[57] ABSTRACT

A fuel vapor generator in the form of a heat conductive member having an elongated U-shaped passageway formed through it. The member is mounted at the exterior of a carburetor venturi. A first open inlet end of the passageway extends through the venturi walls and receives atomized fuel from the main fuel nozzle and a portion of the incoming air. This fuel and air mixture is directed through the passageway where it is heated and the fuel is vaporized. The fuel and air are drawn from the passageway and returned into the venturi at a location downstream from the main nozzle. A series of mesh screens extending across the passageway and spaced along its length assist in atomizing the fuel and assuring efficient conduction of heat to the entire mixture of fuel and air within the passageway.

11 Claims, 3 Drawing Figures

FUEL VAPOR GENERATOR

BACKGROUND OF THE INVENTION

This invention relates to an improvement in conventional carburetors used in conjunction with internal combustion engines. The basic purpose of a carburetor is to mix a hydrocarbon fuel such as gasoline and air to form a combustible mixture to power the pistons of an engine. A theoretically perfect carburetor should vaporize the fuel completely as it is discharged at the main fuel nozzle of the carburetor and should maintain the vaporized condition of the fuel through its delivery to the engine cylinders. However, such perfect vaporization exists only in theory.

Droplets of unvaporized gasoline are considerably heavier than the gaseous mixture with which they are traveling. Their greater inertia causes them to continue in the direction they are moving when the mixture turns to follow a passage or to enter another passage. If possible, the heavier particles continue straight ahead until they reach a dead end, rather than to make the desired turns. This results in the center cylinders of a cylinder bank in many engines being run on a richer mixture than the end cylinders. Better mixture distribution is one argument in favor of special multiple carburetors and specially "tuned" intake manifolds.

Good mixture distribution is important to smooth engine operation, even throttle response, reasonable fuel mileage and decreased exhaust emissions. Engine manufacturers to date have attempted to correct this problem by heating the mixture of fuel and air as it leaves the carburetor, thereby attempting to more completely vaporize the fuel in the mixture. This is typically done by routing exhaust gases to heat the intake manifold. Heat also is applied by many manufacturers by using a heated air cleaner which sends hot air to the carburetor on a cold engine and shortens the warmup time.

The area of the manifold that is heated is directly below the carburetor. This causes the mixture of gasoline and air to pass through a high temperature area immediately after leaving the carburetor. If the temeperature is high enough, most of the fuel will theoretically remain vaporized on its way to the cylinders.

The application of heat at the intake manifold does not work as effectively in practice as in theory. First, there is a large volume of air and fuel which must be heated as it passes rapidly along the intake manifold walls. The retention period for the mixture within the limited space available at the conventional intake manifold is very brief and there is not much opportunity to thoroughly heat the large volume of fuel-air mixture. Furthermore, more heat will obviously be applied to that portion of the mixture adjacent to the intake manifold walls than to the inner volume of the mixture.

Heated intake manifolds improve the operation of an engine, but do not assist in improving the power output. In a full throttle condition, an engine will develop more power if the air-fuel mixture is cool rather than heated. A cool mixture is more dense than a warm mixture, which means that if the mixture is cool more gasoline and air can be packed into the combustion chamber than is possible when using a mixture that has been thinned out by heat. Thus for miaximum horsepower, the engine must be warm and the mixture of fuel and gasoline must be cool.

Devices for heating the mixture of gasoline and air in an attempt to fully vaporize the mixture prior to introduction into the intake manifold have been disclosed in prior patents in many different forms. U.S. Pat. No. 1,124,706 to Conwell shows a finned heat exchanger interposed between a carburetor and the intake manifold. The heat exchanger is heated by exhaust gases. Similarly, U.S. Pat. No. 3,150,652 to Hollabuagh utilizes heat from the cooling system to add heat between a carburetor and an intake manifold. It specifically describes valves that control the application of the heat. Another similar arrangement using heat from the exhaust manifold is shown in U.S. Patent 3,042,016 to Christian.

Another approach indicated by prior patents is to apply heat to the gasoline prior to its introduction into the venturi or throat of the carburetor. U.S. Pat. No. 1,684,246 to Salve shows a helical groove through which an initial mixture of air and the incoming fuel is heated by an electrical heating element as it passes from the float chamber to the main mixing chamber of the carburetor. U.S. Pat. No. 1,973,362 discloses a heating element which operates in a similar manner.

The present disclosure utilizes a simple diverting heat exchanger to thoroughly vaporize all of the incoming atomized gasoline, along with a portion of the incoming air. It interrupts the normal flow of the mixture through the venturi of the carburetor, diverting it through an elongated passageway where heat is applied to the mixture to completely vaporize the gasoline. This is preferable to heating of the new gasoline, which results in loss of evaporated gasoline and causes flooding of the engine when it is warm. This device eliminates the need for the application of heat to the intake manifold. It allos the engine to be run on a cooler mixture than is practical under present engine design.

SUMMARY OF THE INVENTION

The fuel vapor generator described herein is designed for use in conjunction with a conventional internal combustion engine that utilizes a carburetor with a main nozzle through which atomized fuel is discharged at the venturi of the carburetor. It structurally comprises a heat conductive member located at the exterior of the carburetor, having an elongated passageway with open inlet and outlet ends. The inlet end of the passageway is positioned within the carburetor venturi at a location such that the atomized fuel leaving the main nozzle is directed into the passageway. Approximately one fourth to one sixth of the incoming air is also received within the inlet of the passageway. The fuel and air are pulled through the passageway by vacuum pressure applied to the outlet end of the passageway, which projects into the carburetor venturi downstream from the main nozzle. Mesh screens are interposed across the passageway to assist in heat conduction and to atomize and break up any droplets of fuel. A jacketed heat exchanger can be utilized about the portion of the member exterior to the carburetor to add heat as required for proper vaporization of the fuel.

The basic method of vaporization relates to the withdrawing of the atomized fuel and a portion of the air entering the carburetor by directing the fuel and air into an elongated hollow member exterior to the carburetor and thermally insulated from the carburetor so as to eliminate heat of the carburetor by the vaporizing procedure. The atomized fuel and air is directed back into the venturi of the carburetor downstream from the main nozzle. Heat is applied to the fuel and air mixture at the exterior of the carburetor.

It is a first object of this invention to provide a relatively simple mechanical device to more thoroughly vaporize incoming fuel prior to induction of the fuel to the intake manifold of an internal combustion engine. The device requires little structural modification of a carburetor and no substantial modification of carburetor setting, ignition settings or normal engine operation.

Another object of the invention is to improve vaporization of gasoline without applying heat to the stored liquid fuel within the carburetor, which would otherwise evaporate and flood the engine when it is running warm. By not heating the liquid fuel, evaporation of gasoline in the carburetor is eliminated when the engine is at rest. This eliminates much of the starting difficulty which would occur if heat were applied to the float bowl of the carburetor.

Another object of the invention is to vaporize the fuel while carried along in a fraction of the incoming air. This permits vaporization to occur in a relatively small volume and allows the fuel to be delivered to the engine in a relatively cool total mixture of gasoline and air.

Another object of the invention is to vaporize the fuel so thoroughly that no further heating of the intake manifold is necessary for proper fuel-air mixture distribution to the several cylinders of an engine.

Another object is to provide an apparatus and method which is capable of delivering vaporized fuel more evenly at all speeds and particularly at high speed operation.

These and further objects will be evident from the following disclosure, taken together with the accompanying drawings, which illustrate a preferred example of the invention in structural detail. The invention is not to be limited to the specific details illustrated and described herein with respect to the preferred embodiment. The appended claims define the invention.

DRAWING DESCRIPTIONS

DESCRIPTION OF A PREFERRED EMBODIMENT

Figure 1:
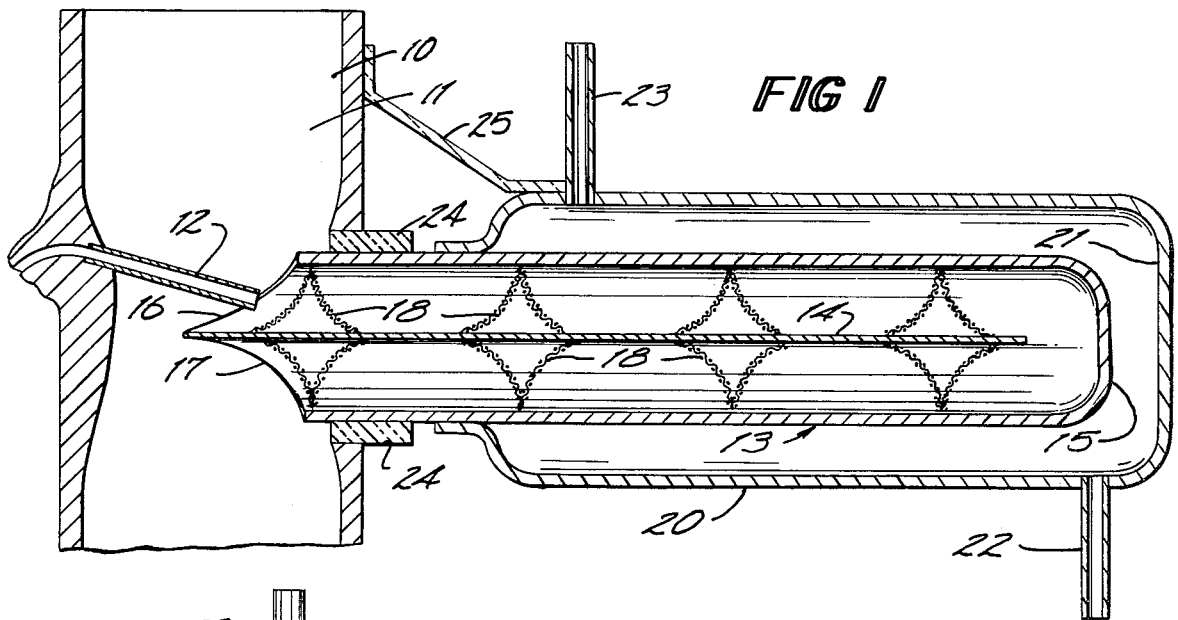
FIG. 1 is a sectioned view of the present device in relation to the venturi of a carburetor shown in schematic form in which the device is installed.

A physical example of the device is illustrated in FIG. 1, which schematically shows the basic portions of a carburetor with which the device is utilized. The simplified presentation of the carburetor elements is presented only by way of illustration. Obviously, the device can be utilized in conjunction with many different forms of existing or future carburetors which incorporate the basic elements discussed herein.

This device is designed for use in a carburetor having one or more venturis or throats through which a fuel-air mixture is delivered to the intake manifold (not shown) of an internal combustion engine. The throat of the carburetor is generally indicated at 10. It includes a restricted area 11 commonly termed the "venturi". A main nozzle 12 directs fuel to the venturi in response to the vacuum pressure created by the venturi and operation of the engine. Fuel may be delivered to the main nozzle 12 by any conventional means, typically from a float bowl and main metering jet (not shown). In many carburetors additional venturis exist and are located about the outlet of the main nozzle 12. These should either be removed or the main nozzle replaced by a more simplified tube as illustrated in FIG. 1. In any respect, the main nozzle 12 should direct the incoming fuel to the inlet of this device as discussed below.

The device itself basically comprises a hollow tubular member 13 having an elongated interior passageway, illustrated as being substantially U-shaped. The passageway could obviously have other configurations and might be coiled, curved or bent in order to properly fit within the existing space surrounding the carburetor and engine. However, a simple elongated straight passageway having a U-shaped configuration is both practical and useful.

In the illustrated device, the hollow tubular member 13 is fabricated from cylindrical tubing. It has a substantial length with respect to the width of the venturi 11 to provide a relatively long passageway through which the fuel must pass. Member 13 is bisected by a center plate 14 that extends across its full width. Plate 14 terminates short of an outer or closed end 15 of member 13. It therefore defines an elongated U-shaped passageway extending across the top of the device from an open inlet end 16 to outer end 15 and back along the lower portion of member 13 to an open outlet 17.

When the device itself is mounted at the exterior of the carburetor, the inlet and outlet ends 16, 17 are projected into the carburetor venturi or throat. They are formed at opposite oblique angles with respect to the axis of the member 13, so as to entrap a portion of the incoming air in the inlet end 16 and so as to present a larger discharge area for application of engine vacuum to the outlet end 17.

The object of this device is to heat fuel discharge from the main nozzle 12 carried within a portion of the incoming air entering venturi 11 to a temperature adequate to boil or vaporize any remaining liquid droplets of fuel in the mixture. The conduction of heat is accomplished by constructing the walls of the passageway within member 13 from heat conductive material, such as copper or aluminum. Heat transfer is enhanced by use of a series of metallic screens of relatively fine mesh, directed across the full width of the passageway as it leads away from the intake end 16 and to the outlet end 17 of member 13. The screens 18 also assist in more complete vaporization of liquid fuel by physically breaking up larger droplets of fuel as they pass through the fine mesh. Screens 18 should also be constructed of heat conductive material such as copper or aluminum. The materials used in the device must also be chemically inert to hydrocarbon fuel so as to not decompose during use.

As the fuel and air mixture pass along the elongated passageway between intake end 16 and outlet end 17, it must be heated to a temperature adequate to vaporize the remaining gasoline droplets. This heat might be applied directly due to the proximity of the device to other heated portions of the engine with which it is utilized. A heat exchanger as such might not always be required. However, for more universal application, it is desirable that an enclosing jacket 20 be mounted about the member 13 to direct a heated fluid about the exterior walls of member 13 during use of the device. As illustrated, the jacket 20 is a cylindrical tube having an enclosed end 21 spaced from the end 15 on member 13 and sealed along its end adjacent to the carburetor. Inlet and outlet connections 22, 23 are provided for reception of cooling water utilized in operation of the engine, heated exhaust gases or other available heated fluids. They should be at a temperature of about 160° F. Such fluid is circulated through the jacket 20 continuously during use of the device.

The device should be thermally insulated from the carburetor itself. Since heat is applied to the device, it is desirable that insulation be utilized to prevent the application of heat to the walls of the carburetor. Such heat would tend to evaporate liquid fuel in the float bowl (not shown), which might flood the engine when it is running warm. Such evaporation is also undesirable when the engine is at rest, since it makes initial starting of the engine difficult when the bowl is dry. Thermal insulation can be provided in the form of a surrounding bushing 24 that mounts member 13 through the walls of venturi 11. Auxiliary brackets 25 (FIG. 1) can also be utilized to mount the device to the carburetor as necessary. The brackets 25 should also be constructed by way of a thermal insulating bushing or other insulating structure.

This device can be installed on existing carburetors by simple drilling a single hole through the body of the carburetor to inject the inlet and outlet ends of the device into the venturi, with inlet end 16 in direct communication with the oulet of main nozzle 12 and outlet end 17 located in the venturi or throat of the carburetor downstream from the outlet of main nozzle 12. The bushing or insulator 24 can be in the form of a resin or plastic cement utilized to secure the member 13 to the walls of the carburetor. The size and shape of the device varies according to the amount of fuel needed and the space available for installation at the exterior of a particular carburetor. The rich or lean quality of the fuel-air mixture is easily adjusted by positioning inlet end 16 in venturi 11. By directing main nozzle 12 further into inlet end 16, and by moving outlet end 17 further into the carburetor, move vacuum will be exerted through the passageway of the device, thereby drawing additional atomized fuel from main nozzle 12 into inlet end 16 of member 13. Proper adjustment will divert about one fourth to one sixth of the incoming air into inlet end 16. The member 13 can be fixed in place permanently or can be releasably mounted so as to be axially adjustable as desired.

Figure 3:
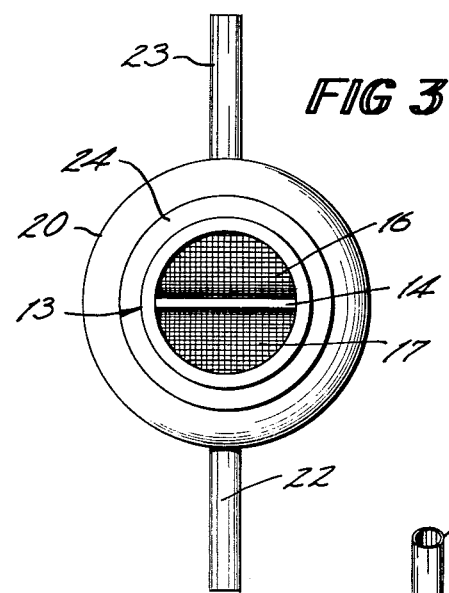
FIG. 3 is an end view looking toward the inlet and outlet ends of the device as seen from the left in FIG. 2.
Figure 2:
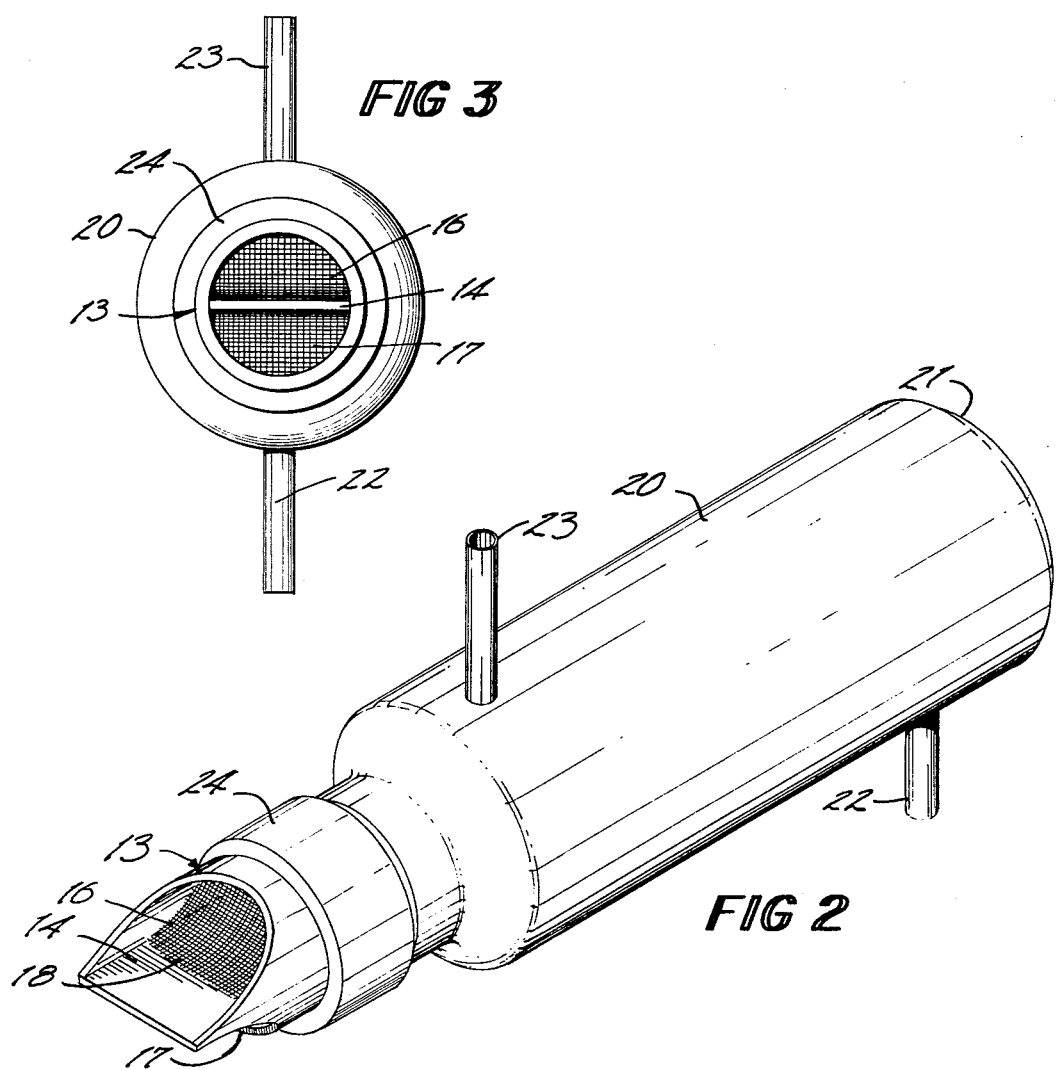
FIG. 2 is an exterior pictorial view of the device apart from a carburetor.

FIGS. 2 and 3 show further structural details of an actual working model of the device apart from a carburetor. The same numerals utilized in FIG. 1 are applied to these figures to designate the various elements of the device.

This invention arose from the experience of the inventor in installing and maintaining liquid propane gas systems for warehouse vehicles and operation and maintenance of a refrigeration plant. This experience with vaporization of gases is now directed to the vaporization of gasoline for use in an internal combustion engine. When using liquid propane, the resulting gas must be vaporized as completely as possible so as to be efficient for engine operation. In refrigeration systems, the usual Freon gas must also be vaporized for efficiency. The present invention resulted from an effort to build a device that would vaporize gasoline as completely as possible to provide better combustion and fewer exhaust emissions.

The development of this invention followed initial experimentation with use of an electrical heat coil in the booster venturi of a carburetor. This failed because it is practically impossible to vaporize as much liquid fuel as is needed for typical automobile engines in such a small area. The heat also was detrimental because of the resulting heat transfer to the carburetor itself. This caused rapid evaporation of the gasoline in the carburetor bowl, releasing the hydrocarbons into the air after engine shutdown and leaving the carburetor bowl empty. The engine was therefore exceptionally hard to start without excessive cranking power. Other proposed heat exchangers were studied which applied heat inside the carburetor, around the carburetor throat, or between the carburetor and intake manifold. However, such heat application is self-defeating because the fuel-air mixture is expanded so substantially as to cause a lower air-fuel ratio and a mixture that is too lean for high power operation of an engine.

The theory of this disclosure is to provide complete combustion by complete vaporization of gasoline mixed with cooled condensed air, which will result in even distribution of the complete mixture to the cylinders. Realizing that this would not be accomplished within the carburetor, it was decided to design a fuel vapor generator that would re-route the flow of fuel and a portion of the incoming air which would otherwise have passed directly through the venturi of the carburetor. This partial mixture is directed into passageways or tubing to the exterior of the carburetor and through a heat exchanger which might include a series of screens. It is returned as vaporized fuel to the venturi, where it is mixed with cool incoming air. By use of this device, a much larger area or volume is provided in which to vaporize the fuel and need for heat in the intake manifold is eliminated. A cooler fuel-air mixture flow to the cylinders results in a higher air-fuel ratio at idle, thus reducing exhaust hydrocarbons.

Several items contribute to the rapid evaporation and vaporization in this device. First, the vacuum applied from the venturi of the carburetor, which draws fuel and air through the elongated passgeway permits boiling or vaporization of the liquid at lower temperatures. Next, the series of screens atomize the droplets of gas and assure more intimate conductive heat transfer from the device to the liquid gasoline. Third, the conductive heat transfer to the passageway and screens from an exterior source of heat, which might be a heated fluid (hot water or exhaust gas) surrounding the elongated passageway exterior of the carburetor provide additional heat needed for vaporization. Exterior heat is necessary to counteract cooling action due to vaporization of fuel which would otherwise tend to condense the fuel as fast as it is vaporized.

Upon installation of the device in existing automobile engines, substantial gains in gasoline mileage have been demonstrated without loss of acceleration ability. An analysis of the engine operation has shown as increase in the air-fuel ratio in comparison to normal engine and carburation settings. Analysis also has shown more even distribution of the vaporized fuel to all cylinders at high speed and high power operation. There is also a definite gain in horsepower at higher speed engine operation. After rapid acceleration and succeeding deceleration in a conventional engine, large amounts of liquid fuel are trapped in the intake manifold, resulting in a high percentage of hydrocarbons which are lost through the exhaust system. With this apparatus in use, it has been demonstrated that vaporization of the fuel occurs to such a degree that a lesser percentage of hydrocarbons is trapped in the intake manifold upon such deceleration.

To summarize the advantages of the device, one principal advantage is the ease of installation on most existing carburetors. Furthermore, the device can readily be incorporated into the design of new carburetors, either as an integral part of the carburetor or as a separable accessory. There are no moving parts in the product and no maintenance is required to keep it operating properly. By re-routing the fuel-air mixture to the exterior of the carburetor, the device provides increased volume in which to vaporize the fuel beyond that would otherwise be available within the carburetor. As an example, a six inch member provides a passage twelve inches long for vaporizing fuel. The device takes advantage of heat that is readily available from the engine itself or from the cooling system or exhaust system of the engine. It can be readily adjusted by axially positioning it for a rich or lean mixture. It vaporizes the fuel at the carburetor and eliminates the need for heat at the intake manifold. A lower temperature thermostat can thus be used in the cooling system, permitting the use of cooler air for the engine to provide an increased air-fuel ratio. This results in a cleaner burning engine, fewer emissions, greater mileage and longer engine life.

Modifications can obviously be made with respect to the structural features specifically illustrated and described above. For these reasons, only the following claims are intended to limit and restrict the scope of the invention disclosed.

Having thus described my invention, I claim:

1. A fuel vapor generator for an internal combustion engine including a carburetor that has a main nozzle with an outlet through which fuel is normally discharged into a venturi through which the fuel-air mixture is drawn into an intake manifold, the fuel vapor generator comprising:
    a hollow tubular member having interior walls which form a continuous passageway double back upon itself in an elongated configuration, the passageway terminating at open inlet and outlet ends located adjacent to one another;
    thermal insulating means surrounding the member at locations adjacent the inlet and outlet ends of the passageway adapted to fix the member to the exterior of a carburetor with the inlet end projecting into a portion of the venturi in receptive communication with the outlet of the main nozzle and with the outlet end projecting into the venturi downstream from the location of the inlet end to thereby direct the fuel and a portion of the air entering the carburetor through the passageway;
    means for heating the hollow tubular member to a temperature above the boiling point of the fuel.

2. The fuel vapor generator set out in claim 3, further comprising: a series of mesh screens each extending across the interior walls of the passageway and spaced apart from one another along the length of the passageway.

3. The fuel vapor generator as set out in claim 1, wherein said lastnamed means comprises an enclosed jacket surrounding the portion of the tubular member remote from its inlet and outlet ends, said jacket including inlet means and outlet means for circulation of heated fluid between the interior of the jacket and that portion of the exterior of the hollow tubular member enclosed by the jacket.

4. The fuel vapor generator set out in claim 1, wherein said hollow tubular member comprises:
    an elongated cylindrical metal tube having a cap across one end and being open at its remaining end;
    and an elongated plate extending across the interior of the tube from its open end to a location spaced inwardly from the cap.

5. The fuel vapor generator set out in claim 1, wherein said hollow tubular member comprises;
    an elongated cylindrical metal tube having a cap across one end and being open at its remaining end;
    and an elongated plate extending across the interior of the tube from its open end to a location spaced inwardly from the cap;
    said fuel vapor generator further comprising a cylindrical tubular jacket surrounding the one end of the tube and extending along a substantial part of the total length of the tube, said jacket being coaxial with the tube and spaced outwardly therefrom, the jacket being sealed about the tube at its end facing the open end of the tube and having inlet means and outlet means for circulation of heated fluid material between the interior of the jacket and that portion of the exterior of the hollow tubular member enclosed by the jacket.

6. A fuel vapor generator for an internal combustion engine including a carburetor that has a main nozzle with an outlet through which fuel is normally discharged into a venturi through which the fuel-air mixture is drawn into an intake manifold, the fuel vapor generator comprising;
    a hollow tubular member having interior walls which form a continuous passageway doubled back upon itself in an elongated configuration, the passageway terminating at open inlet and outlet ends located adjacent to one another, said passageway having walls made of heat-conductive material;
    mounting means adapted to fix the member to the exterior of a carburetor with the passageway of the member leading to the interior of the carburetor through the walls of the carburetor venturi for locating the inlet end of the passageway adjacent to the outlet of the main nozzle of the carburetor and across a portion of the venturi and for locating the outlet end of the passageway at a location downstream from the outlet of the main nozzle of the carburetor to thereby direct the fuel and a portion of the air entering the carburetor through the passageway;
    and means for applying heat to the walls of the passageway intermediate its respective inlet and outlet ends.

7. A fuel vapor generator as set out in claim 6 wherein said lastnamed means comprises a fluid-receiving jacket surrounding the member remote from its inlet and outlet ends for circulation of heated fluids between the member and jacket.

8. A fuel vapor generator as set out in claim 6 wherein the mounting means comprises a thermal insulating bushing adapted to be interposed between the hollow member and the carburetor.

9. A fuel vapor generator as set out in claim 6 further comprising:
    a series of mesh screens each extending fully across the passageway, the screens being spaced apart from one another along the length of the passageway.

10. In a carburetor for an internal combustion engine wherein the carburetor has a main nozzle with an outlet through which fuel is discharged and a venturi through which a fuel-air mixture is drawn into an intake manifold;

the improvement comprising:

a hollow member having an open elongated passageway formed therein leading between an inlet end and an outlet end, said passageway having walls made of heat-conductive material;

mounting means for fixing the member to the exterior of the carburetor with the passageway of the member leading to the interior of the carburetor through the walls of the carburetor venturi for locating the inlet end of the passageway adjacent to the outlet of the main nozzle of the carburetor and for locating the outlet end of the passageway in the venturi of the carburetor at a location downstream from the outlet of the main nozzle of the carburetor;

and means for applying heat to the walls of the passageway intermediate its respective inlet and outlet ends.

11. A method of vaporizing atomized fuel delivered from the main nozzle of a carburetor on an internal combustion engine; comprising the following steps:

withdrawing the atomized fuel delivered from the main nozzle of the carburetor and a portion of the air entering the carburetor by directing the fuel and air into an elongated hollow member exterior to the carburetor and thermally insulated therefrom;

directing the fuel and air mixture in said member back into the venturi of the carburetor downstream from the main nozzle;

and applying heat to the fuel and air mixture while it is exterior of the carburetor.

* * * * *